(12) United States Patent
Bernard et al.

(10) Patent No.: US 12,347,335 B2
(45) Date of Patent: Jul. 1, 2025

(54) MODULAR MODELLING KIT FOR DRAWING GEOMETRIC STRUCTURES

(71) Applicants: UNIWERSYTET JAGIELLONSKI, Cracow (PL); THE TRUSTEES OF INDIANA UNIVERSITY, Bloomington, IN (US)

(72) Inventors: Pawel Bernard, Tomaszowice (PL); James Mendez, Franklin, IN (US)

(73) Assignees: UNIWERSYTET JAGIELLONSKI, Cracow (PL); THE TRUSTEES OF INDIANA UNIVERSITY, Bloomington, IN (US)

( * ) Notice: Subject to any disclaimer, the term of this patent is extended or adjusted under 35 U.S.C. 154(b) by 967 days.

(21) Appl. No.: 17/054,530

(22) PCT Filed: May 11, 2018

(86) PCT No.: PCT/PL2018/050019
§ 371 (c)(1),
(2) Date: Nov. 11, 2020

(87) PCT Pub. No.: WO2019/216780
PCT Pub. Date: Nov. 14, 2019

(65) Prior Publication Data
US 2021/0209964 A1    Jul. 8, 2021

(51) Int. Cl.
*G09B 23/26*    (2006.01)
*A63H 33/06*    (2006.01)
*B29C 64/245*    (2017.01)
*B33Y 10/00*    (2015.01)
*B33Y 30/00*    (2015.01)

(52) U.S. Cl.
CPC .......... *G09B 23/26* (2013.01); *A63H 33/065* (2013.01); *B29C 64/245* (2017.08); *B33Y 10/00* (2014.12); *B33Y 30/00* (2014.12)

(58) Field of Classification Search
CPC .... A63H 33/082; A63H 33/065; G09B 23/26; G09B 23/24
See application file for complete search history.

(56) References Cited

U.S. PATENT DOCUMENTS

| | | | | |
|---|---|---|---|---|
| 4,184,271 | A * | 1/1980 | Barnett, Jr. ............ | G09B 23/26 446/120 |
| 5,178,391 | A * | 1/1993 | Schoen ..................... | A63F 9/12 273/153 R |
| 5,653,621 | A * | 8/1997 | Yao ....................... | A63H 33/082 446/128 |
| 6,050,044 | A * | 4/2000 | McIntosh ............. | A63H 33/082 446/124 |
| 6,343,937 | B1 * | 2/2002 | Curtis .................... | A63H 33/04 434/279 |
| 6,648,715 | B2 * | 11/2003 | Wiens .................. | A63H 33/062 446/124 |

(Continued)

*Primary Examiner* — Eugene L Kim
*Assistant Examiner* — Alyssa M Hylinski
(74) *Attorney, Agent, or Firm* — Rivka Friedman

(57) ABSTRACT

The invention provides a modular modelling kit for drawing geometric structures using a handheld 3D printing pen, comprising construction modules (1), and is characterized in that each construction module (1) has a basically flat base (2) and at least one substantially vertical post (4) protruding from the base (2), having a contact point (4*a*).

7 Claims, 4 Drawing Sheets

(56) References Cited

U.S. PATENT DOCUMENTS

Figure 1:
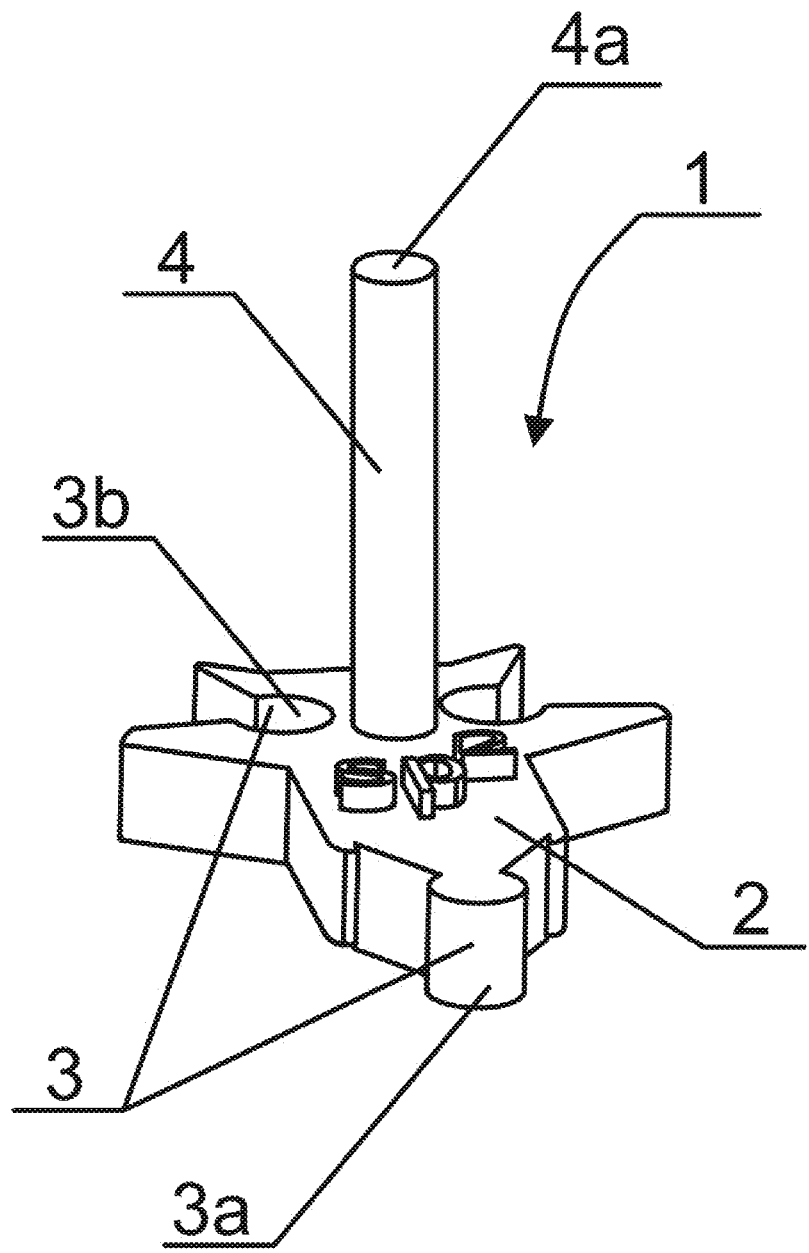

| | | | | |
|---|---|---|---|---|
| 9,548,001 B2* | 1/2017 | Dye | ................... | G09B 23/26 |
| 9,779,638 B2* | 10/2017 | Casarez | ................ | G09B 23/26 |
| 2003/0170601 A1* | 9/2003 | Scheetz | ................ | G09B 23/26 |
| | | | | 434/279 |
| 2005/0089832 A1* | 4/2005 | McClusky | ............ | G09B 23/26 |
| | | | | 434/278 |
| 2006/0276100 A1* | 12/2006 | Glickman | ............ | A63H 33/086 |
| | | | | 446/120 |
| 2009/0186553 A1* | 7/2009 | Aggar | ................. | A63H 33/082 |
| | | | | 446/127 |
| 2015/0371556 A1* | 12/2015 | Smith | .................. | G09B 23/26 |
| | | | | 434/365 |
| 2016/0108261 A1* | 4/2016 | Wiseman | ............. | C09D 11/17 |
| | | | | 522/28 |
| 2016/0346707 A1* | 12/2016 | Kuo | ......................... | E04B 2/12 |

* cited by examiner

MODULAR MODELLING KIT FOR DRAWING GEOMETRIC STRUCTURES

The present invention provides a modular modelling kit for drawing geometric structures using a hand-held 3D printing pen, comprising construction modules Hand-held 3D printing pens have become popular recently, for the ease with which they allow the user to "print" or "draw" 3D structures, by holding the 3D printing pen by the user and drawing lines of plastic material (filament), melted inside the 3D pen, which cures after several seconds forming stiff structures. Such lines may be drawn on a flat or curved surface, or directly in the air. While drawing lines on a flat surface is quite easy, drawing them on a curved surface requires a bit more skill It is especially difficult to manipulate the pen accurately in three dimensions. The most difficult is drawing in the air, as it requires a steady hand, precision and patience, due to the fact that the lines drawn with melted material need several seconds to cure.

Thus, it is common to draw 2D sections and to assemble them together, after they are cured, to make the final 3D construction There are 2D templates widely known, which for example allow the user to draw sides of a building (for example the Eiffel Tower) on a flat surface. After a few seconds, the material is hard and the sides of the building may be assembled into a 3D structure The same 3D pen can be used to add additional material to the joints, securing them together. Some 3D structures are too delicate or complex to draw them this way An example a type of delicate and complex 3D structure are models of chemical molecules. These models must have precise lengths and angles to accurately represent chemical molecules. Such structures are made of repeatable elements which are arranged in different ways thus forming different chemical structures.

Molecular modeling kits are widely used in chemistry classrooms across a wide range of student ages. Among widely used modeling systems, three types of models are most common: balls-and-sticks models, Dreiding (sticks, frame) models, and calotte (space-filling) models One example of such system is disclosed in Chinese document No. CN206471035U, describing a set for constructing models with tunnel-like molecular structure. This set comprises molecular units that slide onto a tunnel frame consisting of fixed rods. The constructed model remains on the frame. Another example may be found in US patent document No. U.S. Pat. No. 9,548,001B, where a set is disclosed for constructing models of various molecules This set comprises particle parts and connector parts which allow to be mechanically connected into a molecule model. EP1348473B1 discloses a "balls-and-stick" construction set, where the sticks constitute magnetic rods of two lengths and the balls constitute ferromagnetic balls.

Known systems let users build models of molecules with appropriate angles and distances between atoms. Unfortunately, in all cases, resources (the number of different pieces) in those kits are limited. The user can build a model, but after use he has to disassemble it and put elements back into the kit for another use. From the school perspective, students cannot take models home and use them later.

3D printing has been used to make models for chemical education and many of examples of such use are provided by their creators on sharing sites such as "Thingiverse" (www.thingiverse.com). There exist also several examples of puzzle-like building toys made with 3D printing or another production technique (U.S. Pat. No. 9,492,734, US Patent Application No. 20170266578). One example using a modular approach to assemble shapes that vaguely represent different molecular structures (U.S. Pat. No. 9,626,880). There are known attempts to use 3D printing pens for modeling in chemical education. For example N. L. Dean, C. Ewan, and J. S. McIndoe (J. Chem. Educ., 2016, 93 (9), pp 1660-1662) designed a system for visualization geometry according to VSEPR (valence shell electron pair repulsion) theory Authors noticed that "Novices to the 3D printing pen find it difficult to manipulate the pen accurately in three dimensions, and even experts usually generate 3D models by drawing 2D sections and assembling them together to make the final model". The system disclosed in this publication is based on 2D templates printed on sheets, similarly to the templates of models of buildings mentioned earlier A user covers templates using 3D printing pen and in this way he gets 2D sections that can be later combined into a 3D model The construction modules obtained this way, after curing, may be connected by means of a "slot-to-slot" system (slots are included in the 2D templates, for reproducing them in the printed construction modules).

There are several technical problems with the existing systems. The typical approach using molecular model kits in the classroom provides a close approximation of molecules and concepts in introductory chemistry but has to be disassembled at the end of the lesson and has a hardware limitation on molecular size.

Current approaches to making models by means of the classic 3D printing (by means of a normal 3D printer) have the benefit of producing low-cost models that students could theoretically keep for themselves but require much longer time to produce. Producing a molecular model with this kind of 3D printing can take up to an hour, making it impractical for in-class activities.

The use of 3D pens has the benefit of being much quicker than other methods but, without a guide or a template, the resulting models generated by novices with 3D printing pens are too imprecise to be useful. Usually, users have to draw 2D parts of the structure, and later combine flat elements into a 3D model.

In order to solve the above-mentioned problems, a modular modelling kit is provided for drawing geometric structures using a hand-held 3D printing pen, comprising construction modules, characterized in that each construction module has a basically flat base and at least one substantially vertical post protruding from the base, having a contact point Preferably the base of each module comprises connection means for connecting it with another module's base in a horizontal plane.

More preferably the connection means constitute a complementary male connector and a female connector.

It is also preferable that the posts vary in length.

In a preferable embodiment, the kit is characterized in that it consists of modules adapted for drawing models of chemical molecules:

a) an $sp^3$ start module for a molecule model with $sp^3$ or tetrahedral geometry, having a T-shaped base and four posts with contact points for three exterior atoms connecting to a central atom;

b) an $sp^3$ left module for a molecule model with $sp^3$ or tetrahedral geometry, having an L-shaped base and three posts with contact points for two exterior atoms connecting to a central atom;

c) an $sp^3$ right module for a molecule model with $sp^3$ or tetrahedral geometry, in its shape being a mirror of the $sp^3$ left module;

d) an $sp^2$ start module for a molecule model with $sp^2$ or trigonal planar geometry, having an angled base and three posts with contact points for two exterior atoms connecting to a central atom;
e) an $sp^2$ left module for a molecule model with $sp^2$ or trigonal planar geometry, having an angled base and two posts with contact points for one exterior atom connecting to a central atom;
f) an $sp^2$ right module for a molecule model with $sp^2$ or trigonal planar geometry, in its shape being a mirror of the $sp^2$ left module;
g) an $sp^2$ both module for a molecule model with $sp^2$ or trigonal planar geometry, having a three-spoke star-shaped base with one spoke longer than the others, and one post with contact point for one exterior atom connecting to a central atom;
h) an sp start module for a molecule model with sp or linear geometry, having a straight base and two posts with contact points for an exterior atom connecting to a central atom;
i) an sp both module (1i) for a molecule model (5) with sp or linear geometry, having a straight base (2) and one post (4) with a contact point (4a) for a central atom;
j) an end module being an end module for any molecule model, having a straight base and one post with a contact point for one atom;

Even more preferably, the kit is characterized in that
a) the $sp^3$ start module has a female connector at the end of the stem of the T-shape of the base,
b) the $sp^3$ left module has a female connector at the bottom of the L-shape of the base and a male connector at the right end of it;
c) the $sp^3$ right module is a mirror of the $sp^3$ left module;
d) the $sp^2$ start module has a female connector at a peak of an outer side of the angled base;
e) the $sp^2$ left module has a female connector at a peak of an outer side of the angled base a male connector at one of the ends of the base;
f) the $sp^2$ right module is a mirror of the $sp^2$ left module;
g) the $sp^2$ both module has female connectors at the ends of shorter spokes of the star-shaped base a male connector on the remaining end of the base;
h) the sp start module has a female connector at one end of the base,
i) the sp both module has a female connector at one end of the base and a male connector at the other end of the base;
j) there are two end modules, of which one constitutes an end male module and has a male connector at one end of the base, while the second constitutes an end female module and has a male connector at one end of the base.

Most preferably the modules are marked, respectively, with $sp^3$, $sp^2$, and sp symbols and/or a pictorial representation of the different geometries.

Figure 2:
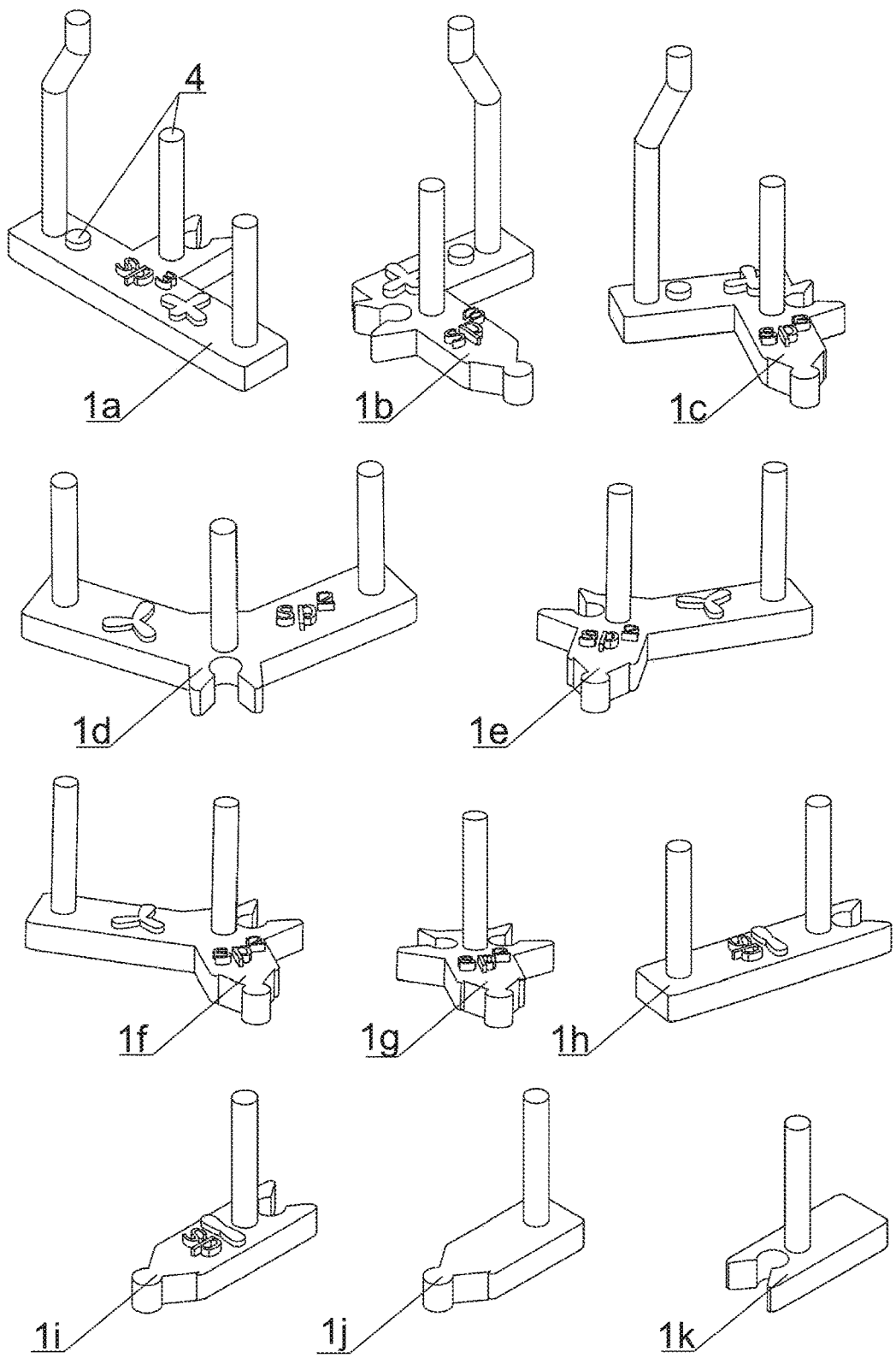
Figure 3:
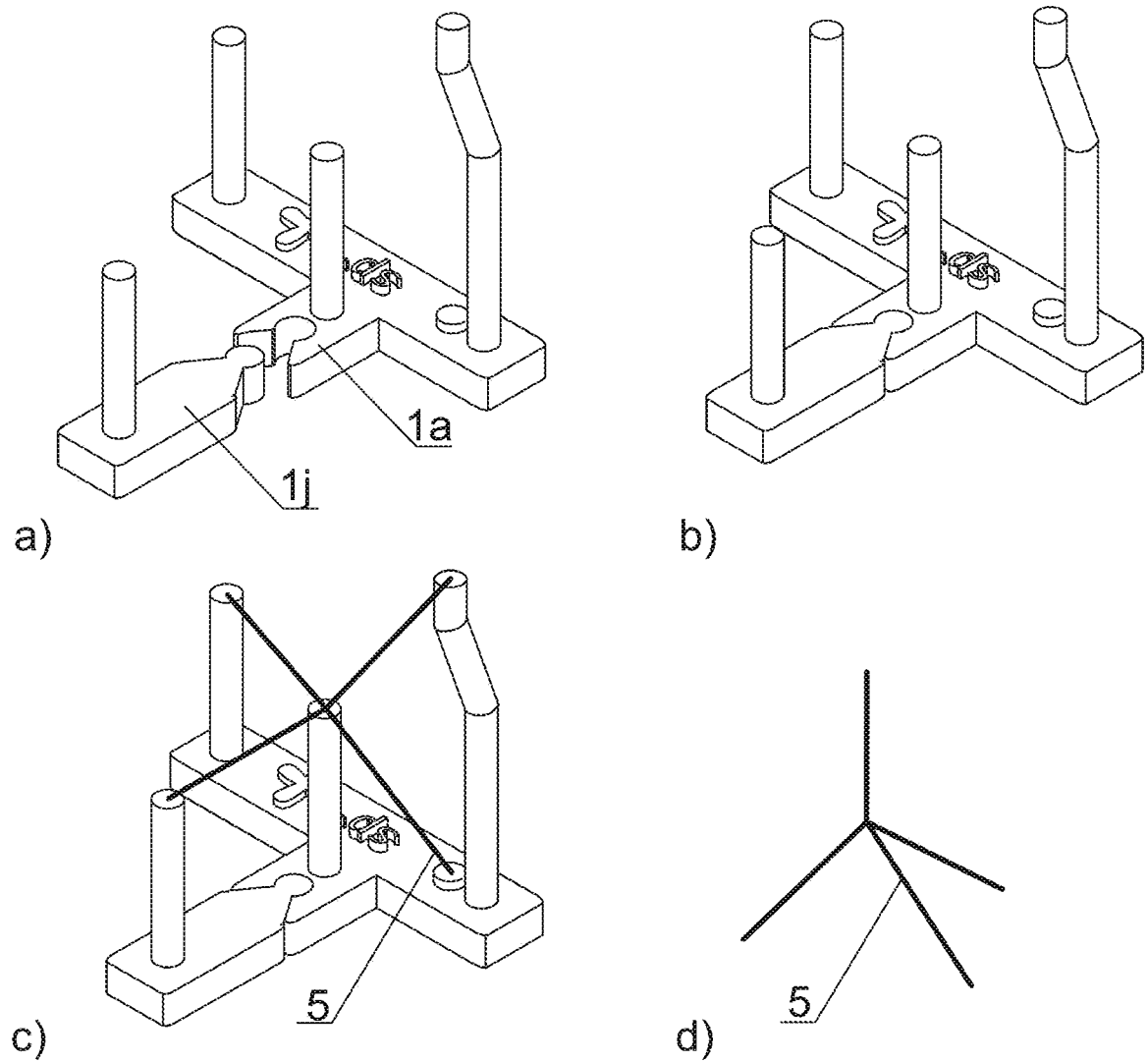
Figure 4:
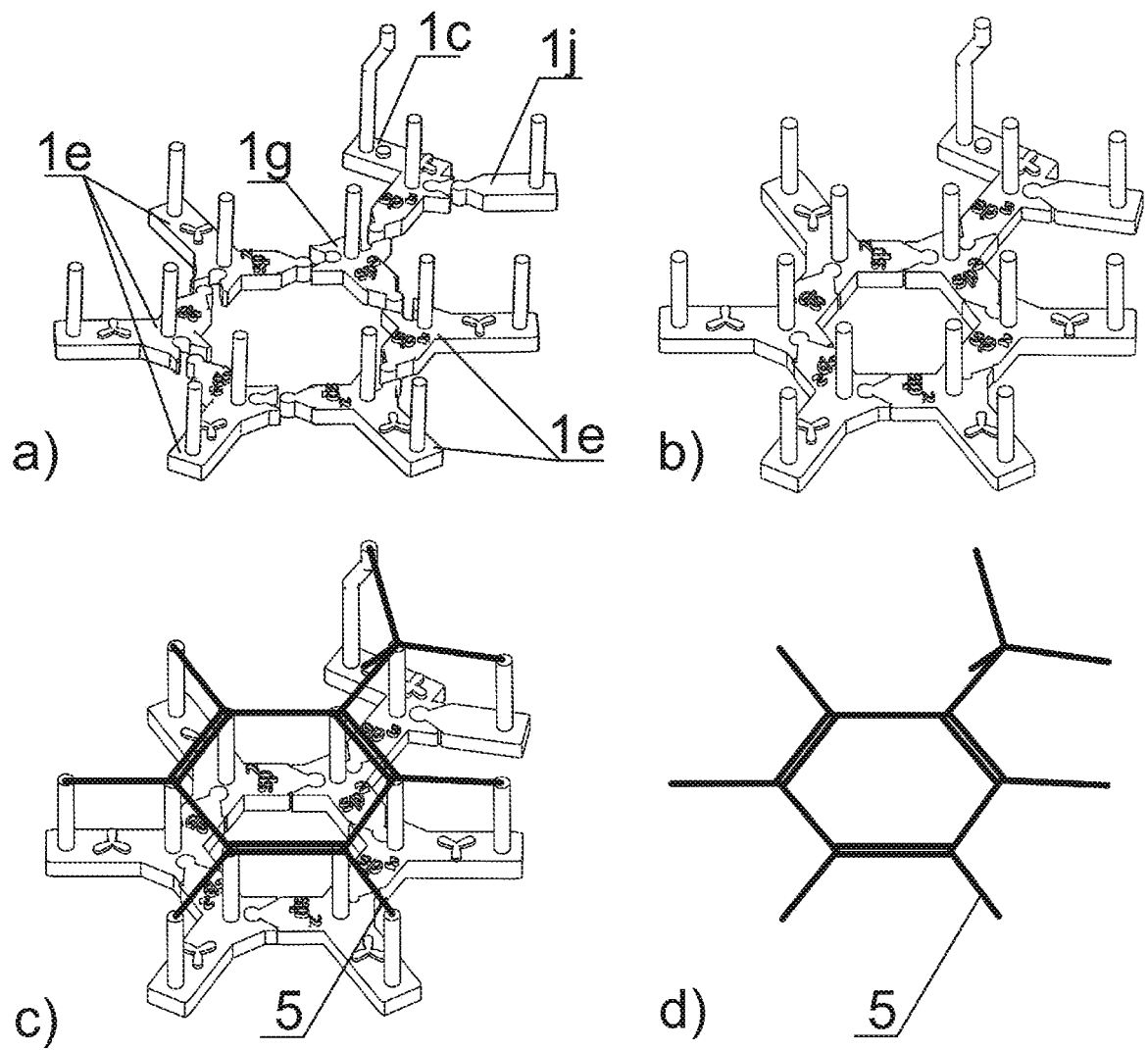

Some of the embodiments of the invention have been presented on the attached perspective drawings in which FIG. 1 shows an exemplary construction module in detail, FIG. 2 shows exemplary set of construction modules for use in a kit for drawing chemical molecules, FIG. 3 shows steps of drawing an exemplary molecule of a methane, FIG. 4 show s steps of drawing an exemplary molecule of toluene.

FIG. 1 shows a perspective view of an exemplary construction module 1 of a modular modelling kit for drawing geometric structures using a hand-held 3D printing pen. A module 1 has a basically flat base 2 and at least one substantially vertical post 4 protruding from the base 2, having a contact point 4a In this exemplary embodiment the contact point 4a is placed at a top of the vertical post 4 but it will be obvious for a person skilled in the art that the contact point 4a may be placed elsewhere on the vertical post without departing from the scope of the invention.

The base 2 of the module 1 comprises connection means 3 for connecting it with another module's 1 base 2 in a horizontal plane In the exemplary embodiment as shown on figures, the connection means 3 constitute a complementary male connector 3a and a female connector 3b. It should be however obvious, that also other connection means may be applied, without departing from the scope of the invention, for example magnets or other connection means.

In the exemplary embodiment in the form of a set of modules 1, as shown on FIG. 2, it may be seen that the posts 4 may vary in length—see in particular for example the module marked with 1a (an $sp^3$ start module), 1b (an $sp^3$ left module), 1c (an $sp^3$ right module). As this figure's purpose is to show an exemplary set of modules 1, only kinds of modules listed below are marked with reference numerals. The parts of modules 1 themselves are not marked (beside posts 4 on module 1a) for clarity of the drawings.

In the preferred embodiment shown on FIG. 2 the kit is adapted for drawing models 5 of chemical molecules and it consists of the following modules 1:
a) an $sp^3$ start module 1a for a molecule model 5 with $sp^3$ or tetrahedral geometry, having a T-shaped base 2 and four posts 4 with contact points 4a for three exterior atoms connecting to a central atom; preferably, the module 1a has a female connector 3b at the end of the stem of the T-shape of the base 2;
b) an $sp^3$ left module 1b for a molecule model 5 with $sp^3$ or tetrahedral geometry, having an L-shaped base 2 and three posts 4 with contact points 4a for two exterior atoms connecting to a central atom; preferably the module 1b has a female connector 3b at the bottom of the L-shape of the base 2 and a male connector 3a at the right end of it;
c) an $sp^3$ right module 1c for a molecule model with $sp^3$ or tetrahedral geometry, in its shape being a mirror of the $sp^3$ left module 1b;
d) an $sp^2$ start module 1d for a molecule model 5 with $sp^2$ or trigonal planar geometry, having an angled base 2 and three posts 4 with contact points 4a for two exterior atoms connecting to a central atom, preferably the module 1d has a female connector 3b at a peak of an outer side of the angled base 2;
e) an $sp^2$ left module 1e for a molecule model 5 with $sp^2$ or trigonal planar geometry, having an angled base and two posts 4 with contact points 4a for one exterior atom connecting to a central atom; preferably the module 1e has a female connector 3b at a peak of an outer side of the angled base 2 and a male connector 3a at one of the ends of the base 2;
f) an $sp^2$ right module 1f for a molecule model 5 with $sp^2$ or trigonal planar geometry, in its shape being a mirror of the $sp^2$ left module 1e;
g) an $sp^2$ both module 1g for a molecule model 5 with $sp^2$ or trigonal planar geometry, having a three-spoke star-shaped base 2 with one spoke longer than the others, and one post 4 with contact point 4a for one exterior atom connecting to a central atom; preferably the module 1g has female connectors 3b at the ends of shorter spokes of the star-shaped base 2 and a male connector 3a on the remaining end of the base 2;

h) an sp start module 1h for a molecule model 5 with sp or linear geometry, having a straight base 2 and two posts 4 with contact points 4a for an exterior atom connecting to a central atom; preferably the module 1h has a female connector 3b at one end of the base 2;

i) an sp both module 1i for a molecule model 5 with sp or linear geometry, having a straight base 2 and one post 4 with a contact point 4a for a central atom; preferably the module 1i has a female connector 3b at one end of the base 2 and a male connector 3a at the other end of the base 2;

j) two end modules 1j, 1k for any molecule model 5, each having a straight base 2 and one post 4 with a contact point 4a for one atom, of which modules 1j, 1k one constitutes an end male module 1j and has a male connector 3a at one end of the base 2, while the second constitutes an end female module 1k and has a male connector 3a at one end of the base 2.

The modules 1 are preferably marked, respectively, with $sp^3$, $sp^2$, and sp symbols and/or a pictorial representation of the different geometries The modular modeling kit according to the invention helps a user draw chemical molecules using a hand-held 3 D printer (3 D pen) This solution is based on a 3 D template (construction module 1) The user draws straight lines in 3 D connecting contact points 4a of the module, and in this way he creates a 3 D model 5 of the molecule The drawn model 5 can be detached from the module 1 for further use. The exemplary kit contains various modules 1 for drawing atoms with $sp^3$, $sp^2$, and sp geometry and is dedicated to drawing small organic molecules. Exemplary modules 1 have puzzle-like connectors (male connectors 3a and respective female connectors 3b) and can be freely combined. Assembled modules 1 create a template, that forms a compact whole, provides desirable distances and angles between elements Users can easily build templates for drawing molecules containing atoms with different geometry, e.g. saturated and unsaturated hydrocarbons, alcohols, aldehydes, ketones, carboxylic acids, esters, amines amides, benzene and its derivatives, etc. The drawing is a 3 D model that represents bond angles and multiplicity of bonds Due to the quick nature of 3 D pens, students can create models in real time during class or on their own.

By this invention various 3 D geometric structures may be drawn, for example basic geometric 3 D shapes like pyramids, cuboids etc., but a preferred use of this invention will be to make accurate chemical models during chemistry classes and as part of homework assignments Due to the fast nature of 3 D pens, an instructor could ask students to create a model of a molecule, for example methane, during classes Students would then assemble proper modules 1 (in this case two modules, $sp^3$ start module 1a and $sp^3$ end module 1j) to create a valid template. After using the puzzle-like connections to assemble the template, the student would then use a 3 D pen to connect the contact points 4a on the template to make the model 5 of the molecule The model 5 would then be detached to allow the student to examine the geometry of it etc. With the extremely low-cost of the materials in the model (approximately 1 cent for a model 5 of methane with current prices), it is expected that the student would be allowed to keep the model.

Examples of drawing process for molecules are shown in FIG. 3 and FIG. 4.

As it can be seen in FIG. 3a, for drawing a model 5 of the molecule methane two modules 1 are needed: an $sp^3$ start module 1a and an end module 1j. They are connected with each other, in this case by means of a male connector 3a and a female connector 3b (puzzle-like connection) In FIG. 3b an assembled template consisting of these two modules 1 can be seen. In FIG. 3c there is a stage where a methane model 5 has been drawn with a 3 D pen After a few seconds, the model 5 may be taken off the template for analysis.

A similar process was shown in FIG. 4 for a model 5 of the toluene molecule. In FIG. 4a it is shown that for drawing a model 5 of toluene molecule there are several modules 1 needed: an $sp^3$ right module 1c, an end module 1j, an $sp^2$ both module Ig and five $sp^2$ left modules 1e. Again, they are connected with each other by means of male connectors 3a and female connectors 3b. In FIG. 4b an assembled template consisting of these modules 1 can be seen. In FIG. 4c there is a stage where the model 5 of a toluene molecule has been drawn with a 3 D pen. After a few seconds, the model 5 may be taken off the template for analysis.

The developed system lets users draw using 3 D pens directly in three dimensions. That approach not only simplifies the modeling process but also lets the user to observe sections of the structure directly in 3 D during creation. It is expected that involvement in the 3 D drawing will have a positive impact on students' abilities to create classical 2D drawings of chemical structures in conventional venues.

Students could also be allowed to take the template pieces home to create models as part of a homework assignment. For example, students could be asked to create several different models at home and bring them back to class This is impractical with traditional molecular model kits because unless a student has a large number of pieces (uncommon with commercially available molecular model kits), one model would have to be taken apart to make another one With this invention, the only thing taken apart is the template, not the models themselves.

The templates can also be used in chemistry classes at many different grade levels. Both the hybridization and a graphical representation are present on each template piece so even younger chemistry learners can understand the different pieces. Because of this, simple models like those described above would be suitable for high school or even middle school level For younger students, it would also be feasible for the teacher or instructor to assemble the templates in advance and allow the students to focus on the drawing On the other hand, older students can focus on larger structures Drawing models based on longer hydrocarbon chain require multiple modules of the same type, like for example the toluene model 5 shown in FIG. 4. University students e g at organic courses may draw even more complex models. In such situation, a student can use several 3 D pens or several various filament colors and mark different atoms with dedicated color For example, using a template for a benzene and two colors of a filament, the student can draw models of meta- orto- and paradichlorobenzene. In this way, using simple templates, they can create a virtually endless variety of organic molecules.

It is obvious, for a person skilled in the art, that the invention is not limited to the exemplary embodiments shown in the present description and drawings. Various modifications may be introduced into the invention within the range of claims and without departing from the invention itself.

The invention claimed is:

1. A 3D printing pen drawing template in a form of a modular modelling kit for drawing geometric structures corresponding to models of chemical molecules, the modular modelling kit comprising a plurality of construction modules, wherein each construction module of the plurality of the construction modules comprises:
a base that is flat, at least one post that is vertical and protrudes from the base, with a contact point at an end of a free tip of the post,
connection means formed at the base for connecting the base with the connection means of other construction modules of the kit,
and wherein the plurality of construction modules comprise the following construction modules adapted for drawing the models of the chemical molecules:
a) an $sp^3$ start module for a molecule model with $sp^3$ or tetrahedral geometry, having a T-shaped base and four posts with contact points for three exterior atoms connecting to a central atom;
b) an $sp^3$ left module for a molecule model with $sp^3$ or tetrahedral geometry, having an L-shaped base and three posts with contact points for two exterior atoms connecting to a central atom;
c) an $sp^3$ right module for a molecule model with $sp^3$ or tetrahedral geometry, having a shape corresponding to a mirror shape of the $sp^3$ left module;
d) an $sp^2$ start module for a molecule model with $sp^2$ or trigonal planar geometry, having an angled base and three posts with contact points for two exterior atoms connecting to a central atom;
e) an $sp^2$ left module for a molecule model with $sp^2$ or trigonal planar geometry, having an angled base and two posts with contact points for one exterior atom connecting to a central atom;
f) an $sp^2$ right module for a molecule model with $sp^2$ or trigonal planar geometry, having a shape corresponding to a mirror shape of the $sp^2$ left module;
g) an $sp^2$ both module for a molecule model with $sp^2$ or trigonal planar geometry, having a three-spoke star-shaped base with one spoke longer than the others, and one post with contact point for one exterior atom connecting to a central atom;
h) an sp start module for a molecule model with sp or linear geometry, having a straight base and two posts with contact points for an exterior atom connecting to a central atom;
i) an sp both module for a molecule model with sp or linear geometry, having a straight base and one post with a contact point for a central atom;
j) an end module being an end module for any molecule model, having a straight base and one post with a contact point for one atom.

2. The 3D printing pen drawing template according to claim 1, wherein the base of each construction module has the connection means for connecting the construction module with the base of another construction module in a horizontal plane.

3. The 3D printing pen drawing template according to claim 2, wherein the connection means are one of: a male connector and a female connector complementary with the male connector.

4. The 3D printing pen drawing template according to claim 1, wherein at least one construction module has posts of different length.

5. The 3D printing pen drawing template according to claim 1, wherein:
a) the $sp^3$ start module has a female connector at an end of a stem of the T-shaped base;
b) the $sp^3$ left module has a female connector at a bottom of the L-shaped base and a male connector at a right end of the L-shaped base;
c) the $sp^3$ right module has a mirrored structure of the $sp^3$ left module;
d) the $sp^2$ start module has a female connector at a peak of an outer side of the angled base;
e) the $sp^2$ left module has a female connector at a peak of an outer side of the angled base and a male connector at one of ends of the base;
f) the $sp^2$ right module has a mirrored structure of the $sp^2$ left module;
g) the $sp^2$ both module has female connectors at ends of shorter spokes of the star-shaped base and a male connector at the remaining end of the base;
h) the sp start module has a female connector at one end of the base;
i) the sp both module has a female connector at one end of the base and a male connector at the other end of the base;
j) there are two end modules, one of which constitutes an end male module and has a male connector at one end of the base, and the other constitutes an end female module and has a female connector at one end of the base.

6. The 3D printing pen drawing template according to claim 1, wherein the construction modules are marked with references "$sp^3$", "$sp^2$", "sp" or a pictorial representation of the different geometries.

7. A method for drawing, by means of a 3D printing pen, geometric structures corresponding to models of chemical molecules, the method comprising the steps:
providing a 3D printing pen drawing template in a form of a modular modelling kit for drawing geometric structures corresponding to models of chemical molecules, the modular modelling kit comprising construction modules, wherein each construction module comprises:
a base that is flat, at least one post that is vertical and protrudes from the base, with a contact point at an end of a free tip of the post,
connection means formed at the base for connecting the base with the connection means of other construction modules of the kit,
wherein at least two construction modules differ from each other by a configuration of posts and at least two construction modules differ from each other by a configuration of connection means,
connecting a plurality of the construction modules to form a particular drawing template;
using the 3D printing pen, drawing straight lines connecting contact points of the vertical posts of the connected construction modules.

* * * * *